3,176,230 455/6

EXAMINER
230

245,005

March 30, 1965 — J. F. COLLINS — 3,176,230

CABLE CONNECTOR AND SIGNAL DISTRIBUTION SYSTEM FOR RADIO RECEIVERS

Filed Dec. 17, 1962 — 2 Sheets-Sheet 1

INVENTOR
JAMES F. COLLINS

BY Scrivener & Parker

ATTORNEYS

March 30, 1965 J. F. COLLINS 3,176,230
CABLE CONNECTOR AND SIGNAL DISTRIBUTION SYSTEM FOR RADIO RECEIVERS
Filed Dec. 17, 1962 2 Sheets-Sheet 2

INVENTOR
JAMES F. COLLINS

BY Scrivener & Parker
ATTORNEYS

United States Patent Office 3,176,230
Patented Mar. 30, 1965

3,176,230

CABLE CONNECTOR AND SIGNAL DISTRIBUTION SYSTEM FOR RADIO RECEIVERS

James F. Collins, Santa Barbara, Calif., assignor to Cable TV of Santa Barbara, Inc., Santa Barbara, Calif., a corporation of California Filed Dec. 17, 1962, Ser. No. 245,005
5 Claims. (Cl. 325—308)

This invention relates generally to a television signal distribution system and, more particularly, to a mechanical and electrical device for connection to a coaxial transmission cable for amplifying and transmitting to one or more television receivers the signals carried by the coaxial cable.

In so-called community antenna systems television signals are transmitted from a single receiving antenna to the home receivers by a coaxial transmission cable which must be tapped to supply a signal to each individual home receiving set. In known practice, high-loss mechanical taps and impedance-matching connectors have been used for connecting the signal-carrying conductor of the transmission cable to the terminals of each television receiver. Also, it is sometimes the practice to sever the coaxial cable for the insertion of series-type branching connectors in the line, resulting in appreciable loss in signal strength. While efforts have been made to provide connectors having impedance matching means for reducing the loss in signal strength resulting from the connection of the receivers to the cable, known connecting means of this type are relatively expensive since one connector is required for each receiver and unsatisfactory results have often been obtained in operation, as known connectors do not isolate the transmission line from undesirable noise signals generated by faulty receivers.

The principal object of this invention has therefore been to provide, for use in such a community antenna television system, a mechanical and electrical device for connection to the coaxial cable, which amplifies the signals carried by the coaxial cable and transmits them to each receiver, which device does not have the disadvantages of known devices and systems which are described above. This principal object is achieved by the invention by providing a mechanical and electrical device having an input terminal adapted for connection to a coaxial cable by an insulation-piercing connector, and having a plurality of output terminals, each of which is adapted to be separately connected to a television receiver, together with an amplifier connected between these input and output means. In accordance with the invention a housing is provided which is clamped to the cable and within which is mounted a transistorized amplifier having an input terminal connected with the inner cable conductor by an insulation piercing-pin, and also having a plurality of output terminals, each of which is provided with a jack connecting device which extends through an opening in the housing, and to each of which the signal input terminal of a television receiver is adapted to be connected. Accordingly, by means of the invention a plurality of television receivers may be connected to the transmission cable by a single multiple-outlet amplifier and a piercing type cable connector.

In further accordance with the invention, the transistorized amplifier is provided as a printed circuit mounted on a board, which is removably supported within the amplifier housing, one end of the board being supported by one of the insulation piercing pins which extend from the housing, the other end of the circuit board being rigidly secured to a removable end wall of the housing whereby, upon removal of the end wall from the housing, the transistorized amplifier and the cable insulation piercing pin, both of which are carried by the board, may be removed for inspection and servicing.

In addition, the invention provides a single-input, multiple-outlet television signal distribution circuit having a transistorized amplifier including a plurality of transformer-coupled transistor stages and an output transformer for isolating undesirable receiver signals from the transmission line. By appropriate design of the components of the amplifier circuit, any desired impedance matching and coupling effects are achieved. Further, the insulation piercing pins which contact the grounded shielding conductor of the cable cause the housing to serve as a ground for the transistorized amplifier, thus protecting service personnel during inspection and repair of the amplifier, if it is serviced without removal from the coaxial cable, and shielding the amplifier against extraneous disturbances.

Figure 1:
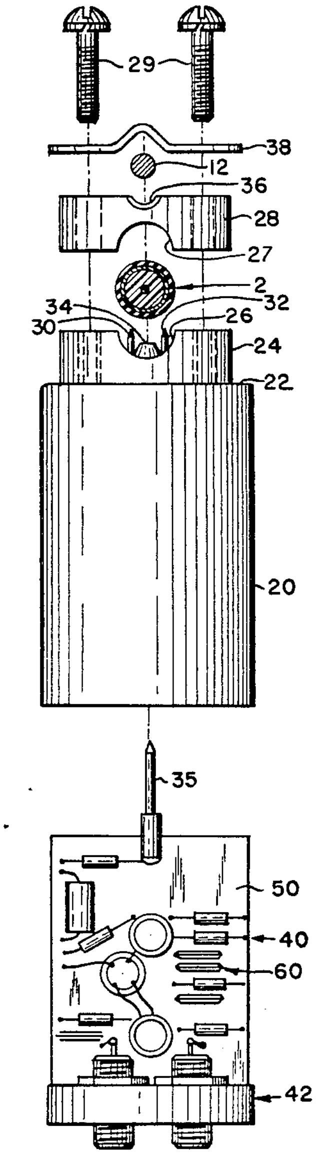
FIG. 1 is an exploded view of parts of the connecting and amplifying device provided by the invention.
Figure 2:
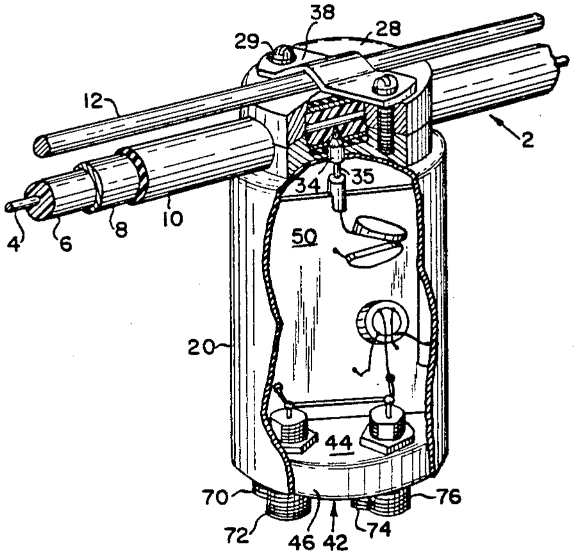
FIG. 2 is a perspective view, with parts broken away, of the connecting and amplifying device, shown in operative relation to a coaxial cable and a messenger cable.
Figure 3:
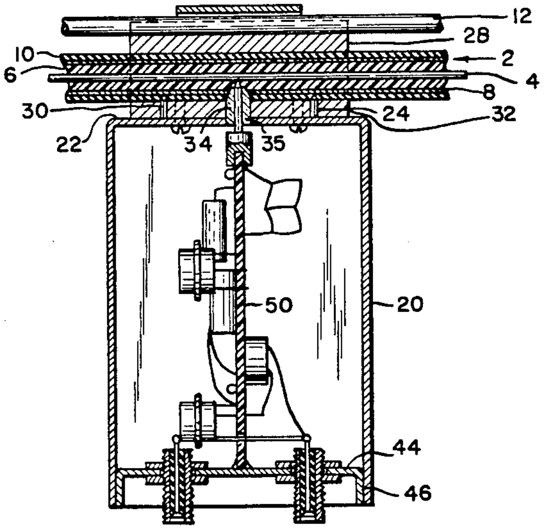
FIG. 3 is an axial sectional view through the parts shown in FIG. 2.

In the drawings forming part of this specification there is shown a coaxial television signal transmission cable 2, one end of which is connected to a television receiving antenna (not shown) which forms part of a so-called community television system. This cable has an inner conductor 4 surrounded by a cylindrical layer 6 of insulating material which, in turn, is surrounded by a tubular braided outer shielding conductor 8 which, in turn, is surrounded by a cylindrical layer 10 of insulating material which forms the outer cover of the cable. When installed for use, as in a community television system, this coaxial cable is supported by a steel messenger cable 12 by means which are described hereinafter.

A mechanical and electrical device is provided by the invention for connecting the coaxial cable 2 at any point along its length to one or a plurality of home or other television receivers, and comprises a housing, transistorized amplifier means in the housing, means for attaching the housing to the cable and for making electrical contact with the central conductor of the cable, and a plurality of devices for connecting the amplifier to television receivers which are to be supplied with signals from the coaxial cable. This device comprises a hollow cylindrical "can" or housing 20 having an end wall 22, on the outer surface of which is mounted a relatively thick cylindrical member 24 which in its upper surface is provided with a diametrically extending groove 26 of semi-circular cross section. A cap member 28, preferably having the same size and cylindrical shape as the end member 24, rests on the upper surface of member 24 and may be connected thereto by screws 29. This cap member 28 has a diametrically extending groove 27 of semi-circular cross section which co-operates with the groove 26 in member 24 to form a passage of circular cross section within which the coaxial cable 2 may be received. The end member 24 is provided with two spaced parallel pointed pins 30, 32, which are preferably formed of stainless steel and which extend in an axial direction outwardly within the groove 26 and are positioned on opposite sides of the axis of the groove. When the housing member 20 is assembled to the coaxial cable these pins pierce the outer insulating cover 10 of the cable and engage the shielding conductor 8, thereby grounding the same through the housing 20, but the pins are of such short length that they do not pierce the inner insulating layer 6 and therefore are not in electrical contact with the central conductor 4. They do, however, prevent any undesired or accidental movement of the housing member 20 and its associated parts with respect to the coaxial cable.

The end wall 22 and outer end member 24 of the housing 20 are provided with a central opening in which there is fixed a generally cylindrical insulating member 34 which extends axially of the housing and is provided with a central opening extending axially of the housing and through which a stainless steel pin 35, which is described below, is adapted to pass when the housing is assembled to the coaxial cable, and which pin pierces all of the elements of the coaxial cable surrounding the central conductor 4 to make electrical contact with that conductor for a purpose and function to be described hereinafter. The insulating member 34 has a rounded upper end which extends upwardly from the lower surface of groove 26 a distance preferably greater than the thickness of the outer insulating layer 10 of the coaxial cable, and which provides means for guiding the piercing pin 35 which engages the central conductor 4.

The outer cap member 28 has a diametrically extending groove 36 in its upper, or outer, surface within which the messenger cable 12 is received when the housing 20 is assembled to the coaxial cable, and a strap 38 is provided which extends across the messenger cable and is attached to the cap member by the screws 29, thus attaching the housing 20 to the messenger cable and the coaxial cable.

The invention provides a removable assembly within the housing 20 for providing an electrical connection to the central conductor 4 of the coaxial cable, and for supporting a transistorized amplifier which is supplied with television signal energy from the central conductor of the coaxial cable, and also for providing a number of output terminals, each of which may be connected by a suitable lead to a television receiver. In accordance with this aspect of the invention there is provided a removable chassis 40 which is adapted for insertion into the housing 20 through the end of the housing 20 opposite to end wall 22. This chassis comprises an end member 42 which closes the open end of housing 20 when the chassis is entirely within the housing and includes a circular plate 44 having a depending flange 46 at its periphery which may be adhesively attached to the interior of the outer end of the cylindrical wall of housing 20 by an epoxy resin. A rectangular supporting plate 50 is connected to the upper or inner surface of plate 44 and extends diametrically thereof and when the parts are assembled extends axially within the housing 20 substantially from end to end thereof. This plate is formed partially of electrically conductive and partially of electrically insulating means, which combine to form what is substantially a printed circuit. Connected to the upper edge of the plate and centrally thereof is the outwardly extending pin 35 which when the parts are assembled extends through the central opening in the insulating member 34 and is of such a length that it pierces the parts of the coaxial cable surrounding the central conductor 4 and engages that conductor.

The electrical components of the amplifier, which are indicated by reference numeral 60 and which are transistors, capacitances, resistors and the like, are mounted on plate 50 and are connected to pin 35 and to each other through the printed circuitry to form a transistorized amplifier which will be described more fully hereinafter. The end plate 44 which closes the open end of the housing member 20 is provided with a plurality (four being shown) of terminals 70, 72, 74, 76 which may be conventional output jacks, each of which is insulated from the closure plate 44 and, therefore, from the housing 20. Each of these terminals provides means for supplying electrical energy from the coaxial cable and the amplifier to an external television receiver by connection through a suitable lead.

Figure 4:
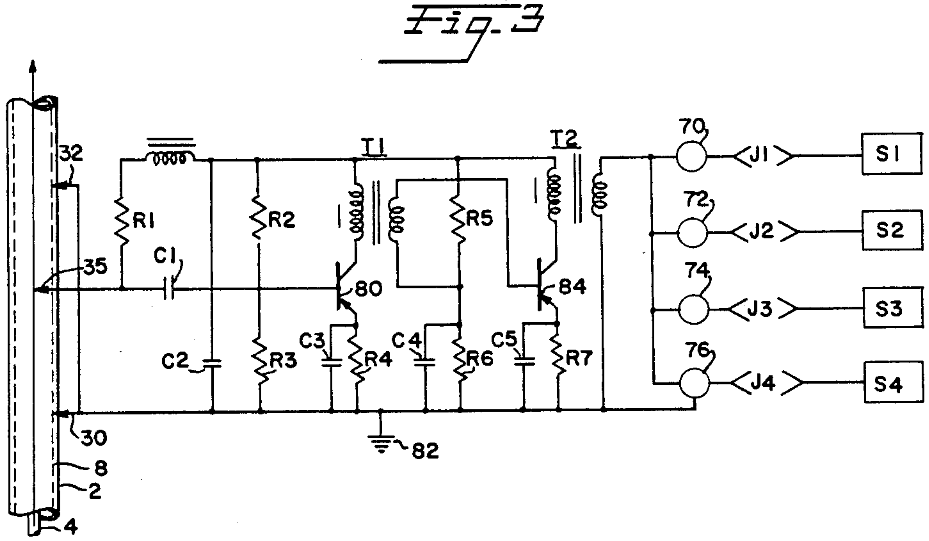
FIG. 4 is a circuit diagram of the multiple-load amplifying and load distribution system provided by the invention.

In FIG. 4 of the drawings there is shown, in circuit diagram, the transistorized amplifier and distribution circuit which is mounted on plate 50 of the removable chassis 40. This circuit comprises an input stage transistor 80, the base electrode of which is connected with inner conductor 4 of cable 2 via capacitor $C_1$ and piercing contact pin 35. Through the combination of input capacitors $C_1$ and $C_2$ the signal strength may be varied to produce a desired output level to television sets, other cables and the like. The input attenuation value of the unit may be varied by changing condensers $C_1$ and $C_2$ to other condensers having desired values, thus giving flexibility of adjustment so that the device provided by the invention may be used for varying signal strengths on the cable end taps. The amplifier ground 82 is connected with the conducting shield 8 of the coaxial cable by pins 30, 32. Second stage transistor 84 has a base electrode connected to the emitter to collector circuit of transistor 80 by transformer $T_1$. The primary winding of output transformer $T_2$ is connected in the emitter to collector circuit of transistor 84, and the output winding of the transformer is connected at one end to ground at 82 and at the other end of the input leads of outlet jacks 70, 72, 74, 76. Individual television receivers, cables or other devices $S_1$, $S_2$, $S_3$ and $S_4$ may be connected to these jacks by suitable jack connectors $J_1$, $J_2$, $J_3$ and $J_4$, respectively. In one working embodiment of the invention the electrical components of the transistorized amplifier are described as follows and have the following values:

| | |
|---|---|
| $T_1$ and $T_2$ | RF transformers. |
| $R_4$ and $R_7$ | 270 ohms, ¼ w.±5%. |
| $R_3$ and $R_6$ | 810 ohms, ¼ w.±5%. |
| $R_2$ and $R_5$ | 10K ohms, ¼ w.±5%. |
| $R_1$ | 2.7K ¼ w.±5%. |
| Transistors 70 and 74 | 2N1742 Philco. |
| $L_1$ | RF choke, 3.9 μh. |
| $C_3$ and $C_5$ | .001 μf. |
| $C_1$ and $C_2$ | 1 μμf. |

These two capacitors may be changed to others of desired values.

In its use and operation the housing 20 of the invention is connected to the messenger and coaxial cables and, in turn, external television receivers, cables or other devices are connected to the output terminals. The housing is connected to the coaxial cable by removing the strap 38 and end cap 28, placing the coaxial cable within the groove 26 in the end member 24, and then replacing the end cap with the coaxial cable in groove 29 to fully enclose the coaxial cable. The messenger cable 12 is then placed in the groove 36 in the outer surface of the end cap 24 and the strap 38 is placed over it. The screws 29 are then used to attach the strap to the end cap and the end cap to the end member 22. When the screws are drawn down tight the pin 35 on the chassis plate 50 passes through the axial opening in insulating member 35 and pierces the concentric layers of the coaxial cable and comes into electrical contact with the central conductor 4. The television signals now pass through pin 35 to the amplifier stages and are applied to jacks 70, 72, 74, 76 through output transformer $T_2$, from which they are supplied to external television receivers, cables or the like $S_1$, $S_2$, $S_3$ and $S_4$.

In addition to minimizing the loss of signal strength, the device provided by the invention amplifies the television signals and controls the frequency response and otherwise overcomes the faults and disadvantages of known mechanical distribution devices. Consequently, better signal levels are provided without adding objectionable noise to the television pictures. Further, the amplifier isolates from the distribution system any feed-back of undesirable signals generated by faulty television receivers. Connection to the cable is effected by the solderless piercing method which eliminates the losses generally attendant on connections of the type in which the cable is severed for insertion of a series type branch connector. Further, the invention compensates for the mismatch of impedance caused by the insertion of pin 35 through the coaxial cable into contact with conductor 4, which mismatch is prevalent in known pressure taps.

While one embodiment of the invention has been illustrated and described, it will be apaprent to those skilled in the art that various modifications may be made in the apparatus described without deviating from the invention set forth in the following claims.

What is claimed is:

1. Apparatus for connecting a plurality of receiver loads to a coaxial transmission cable having a signal-carrying inner conductor, a generally-tubular outer conductor spaced from and arranged concentrically relative to said inner conductor, and layers of insulation on opposite sides, respectively, of said outer conductor, comprising a conductive housing having first and second opposed end walls and containing a chamber between said end walls;

means for connecting said housing with a portion of the cable intermediate its ends, the first wall of said housing being in contiguous engagement with said cable portion;

amplifier means arranged in the housing chamber and including an input terminal, a plurality of output terminals, and a ground lead electrically connected with the housing;

first pin means for connecting said amplifier input terminal with the inner conductor of the cable, said pin means including a conductive pin having a pointed free extremity for piercing the insulation layers on opposite sides of the outer conductor of the cable and for penetrating the outer conductor;

tubular insulator means for insulating said first pin means from said housing and the outer conductor of the cable;

second pin means including at least one second pin having a pointed extremity for piercing the outer insulation layer of the cable and for electrically connecting the amplifier ground lead with the outer cable conductor;

and a plurality of mutually insulated connector means carried by said housing and electrically connected with the amplifier output terminals, respectively, for connecting said output terminals with the respective receiver loads.

2. Apparatus as defined in claim 1 wherein said amplifier means includes also an output transformer having a secondary winding connected at one end with said ground lead, the other end of said secondary winding being electrically connected with each of said connector means.

3. Apparatus as defined in claim 1 wherein said amplifier means includes printed circuit conductor means carried by a support plate arranged in said housing chamber parallel with the axis thereof, one end of said plate being rigidly connected to said second end wall, the pin of said first pin means being carried by the other end of said plate and extending through and spaced from an opening contained in said housing first end wall.

4. Apparatus as defined in claim 3 wherein said housing consists of at least two separable sections first and second ones of which include said first and second end walls, respectively, whereby upon removal of said second section from said housing, said amplifier means and the pin of said first pin means are removed from the housing therewith.

5. Apparatus as defined in claim 4 wherein said tubular insulator means are rigidly mounted in the opening in the said first end wall and slidably receive the pin of said first pin means.

References Cited by the Examiner

UNITED STATES PATENTS

| | | | |
|---|---|---|---|
| 2,615,948 | 10/52 | Kamen | 174—88.2 |
| 2,694,183 | 11/54 | Edlen et al. | 174—71 |
| 2,706,282 | 4/55 | Dudra | 174—71 |
| 3,054,858 | 9/62 | Reid | 325—308 |

OTHER REFERENCES

Carruthers: Radio World, July 2, 1932, pp. 6, 7.

Adorian: Journal British Inst. Radio Engrs., vol. 9, No. 3, March 1949, pp. 89–94.

DAVID G. REDINBAUGH, *Primary Examiner.*